(12) United States Patent
Fort, II et al.

(10) Patent No.: US 7,234,418 B2
(45) Date of Patent: Jun. 26, 2007

(54) HUMMINGBIRD FEEDER

(75) Inventors: W. Grady Fort, II, Mason, TX (US);
Randy Alan Love, Neosho, MO (US);
Michael Ray Stephens, Neosho, MO (US)

(73) Assignee: Daisy Manufacturing Co., Rogers, AR (US)

( * ) Notice: Subject to any disclaimer, the term of this patent is extended or adjusted under 35 U.S.C. 154(b) by 167 days.

(21) Appl. No.: 10/952,929

(22) Filed: Sep. 30, 2004

(65) Prior Publication Data
US 2006/0065202 A1 Mar. 30, 2006

(51) Int. Cl.
*A01K 7/00* (2006.01)

(52) U.S. Cl. .................. 119/72; 119/52.2; 119/57.8; 119/57.9

(58) Field of Classification Search ............ 119/72, 119/51.01, 52.2, 73, 74, 72.5, 51.5, 77, 69.5, 119/57.8, 57.9, 52.1–52.4; D30/121–133
See application file for complete search history.

(56) References Cited

U.S. PATENT DOCUMENTS

| | | | | |
|---|---|---|---|---|
| 813,954 A | * | 2/1906 | Davis | 119/77 |
| 1,801,932 A | * | 4/1931 | Miller | 119/77 |
| 2,696,803 A | * | 12/1954 | Deffenbaugh | 119/52.2 |
| D194,846 S | * | 3/1963 | Parry | D30/125 |
| 3,292,589 A | * | 12/1966 | Williams | 119/77 |
| D241,860 S | * | 10/1976 | Calamia | D30/128 |
| 4,691,665 A | * | 9/1987 | Hefner | 119/77 |
| D331,647 S | * | 12/1992 | Embree | D30/124 |
| D343,030 S | * | 1/1994 | Harwick, Jr. | D30/128 |
| 5,303,674 A | | 4/1994 | Hyde, Jr. | |
| D347,714 S | * | 6/1994 | Maple et al. | D30/128 |
| 5,493,999 A | * | 2/1996 | Schenck | 119/72 |
| 5,682,835 A | * | 11/1997 | Walter et al. | 119/57.8 |
| D399,611 S | * | 10/1998 | Ericson et al. | D30/124 |
| 5,947,054 A | * | 9/1999 | Liethen | 119/57.9 |
| D454,669 S | * | 3/2002 | Lieb | D30/125 |
| D472,351 S | * | 3/2003 | Griffin | D30/128 |
| 6,659,041 B1 | * | 12/2003 | Curts | 119/52.2 |
| 6,739,284 B1 | | 5/2004 | Olive | |
| D505,521 S | * | 5/2005 | Schrodt | D30/124 |

(Continued)

FOREIGN PATENT DOCUMENTS

WO    WO 94/07360    *   1/1994

*Primary Examiner*—Andrea Valenti
(74) *Attorney, Agent, or Firm*—Pillsbury Winthrop Shaw Pittman, LLP

(57) ABSTRACT

A hummingbird feeder having a cover portion and a bottom portion of a base, as well as a nectar reservoir, is disclosed. The cover portion includes a reservoir coupling region, a feeding region, and a first mating region. The reservoir coupling region is configured to be coupled to the nectar reservoir. The feeding region is configured to accommodate a beak of a hummingbird to access nectar. The a bottom portion includes a second mating region, which is configured to mate with the first mating region of the cover portion. Preferably, the bottom portion further includes a retaining wall located within an outer ridge of the bottom portion. The retaining wall retains liquid within an inner region of the bottom portion and restricts liquid from flowing to an outer region of the bottom portion, providing easier maintenance and less mechanical force on the cover portion during feeder use. The reservoir optionally contains a wide opening for easy maintenance.

3 Claims, 9 Drawing Sheets

U.S. PATENT DOCUMENTS

| | | | |
|---|---|---|---|
| D517,749 S * | 3/2006 | Jung et al. | D30/124 |
| 2001/0029899 A1 * | 10/2001 | Arlitt | 119/77 |
| 2004/0134437 A1 * | 7/2004 | Fort, II | 119/57.8 |
| 2006/0037546 A1 * | 2/2006 | Jung et al. | 119/72 |

* cited by examiner

HUMMINGBIRD FEEDER

BACKGROUND

1. Field of the Invention

The present invention relates generally to a bird feeder and, more particularly, to a hummingbird feeder.

2. Background of the Invention

A conventional hummingbird feeder typically includes a small-mouth bottle and a base. Due to presence of high sugar content in hummingbird nectar, which results in accumulation of solids and growth of mold inside the bottle and base, cleaning of the feeder must be frequent to maintain a desirable level of performance. Such frequent cleaning is considered by many users to be difficult for several reasons. For example, the users must use a variety of brushes that can fit into the small mouth of the bottle to clean the interior. Cleaning using a rag or sponge is generally impractical.

Accordingly, there is a clear need for novel hummingbird feeders that are easy to clean. Preferred embodiments of the invention are configured to provide a base that can easily be separated for cleaning.

SUMMARY OF THE INVENTION

One embodiment of the invention provides a hummingbird feeder that includes a nectar reservoir, a cover portion and a bottom portion. The cover portion includes a reservoir coupling region, a feeding region, and a first mating region. The reservoir coupling region is configured to be coupled to the nectar reservoir. The feeding region is configured to accommodate a beak of a hummingbird to access nectar. The bottom portion includes a second mating region. The second mating region is configured to mate with the first mating region.

Preferably, the bottom portion also includes a retaining wall located within and affixed to the bottom portion for retaining liquid within an inner region of the bottom portion that is defined by the retaining wall. The retaining wall preferably restricts liquid from flowing to an outer region of the bottom portion, the outer region lying outside the retaining wall and within an outer ridge of the bottom portion.

Preferably, the bottom portion includes a mounting region configured to receive a mounting pole. The mounting region preferably includes a sleeve that has 3 contact pads defining an inner diameter of about one inch.

Preferably, the hummingbird feeder further includes a perching region. The perching region can be attached to either the cover portion or the bottom portion. For example, the perching region can be attached to the first mating region or the second mating region. Preferably, each of the first mating region and the second mating region includes four mating members. Preferably, the four mating members are equally spaced.

The feeding region includes at least one feeding port that is configured to accommodate a beak of a hummingbird to access nectar. Preferably, the feeding port has an opening of about one-eighth of an inch.

Preferably, the reservoir coupling region includes a spiral thread. Preferably, the reservoir coupling region has a circular shape. Preferably, the circular shape has a diameter ranging from between about two inches and about three inches. Preferably, the diameter is about two and one-half inches.

Another preferred embodiment of the invention includes a hummingbird feeder that includes a nectar reservoir and a base. The reservoir is configured to contain nectar in the interior of the reservoir. The reservoir further includes a mouth through which the nectar flows into and out of the interior of the reservoir. The base is configured to be coupled to the mouth of the reservoir. The feeder includes a mating region for coupling a cover portion of the base and a bottom portion of the base. In addition, the feeder includes a feeding region that is configured to accommodate a beak of a hummingbird to access nectar within the feeder. The bottom portion includes a retaining wall for retaining liquid within an inner region of the bottom portion defined by the retaining wall, and for restricting liquid from flowing to an outer region of the bottom portion.

Preferably, the mouth of the reservoir includes a diameter of about 60 mm. Preferably, the reservoir has a capacity of about 16 to 32 fluid ounces. Preferably, the reservoir includes a hanging device disposed on a top end of the reservoir.

The mating region includes at least one cover mating unit and at least one bottom mating unit. Preferably, the mating region includes four cover mating units and four base mating units.

Preferably, the feeder further includes a perching region. Preferably, the perching region includes a perching ring that is attached to the mating region. For example, the perching region can be attached to the cover portion. Alternatively, the perching region can be attached to the bottom portion.

The feeding region is disposed on the cover portion. Preferably, the feeding region includes at least one feeding port. The at least one feeding port is configured to accommodate a beak of a hummingbird.

Another exemplary hummingbird feeder of the present invention includes a reservoir, a cover portion, and a bottom portion. The reservoir is configured to contain nectar in an interior of the reservoir. The reservoir comprises a mouth through which the nectar flows into and out of the interior of the reservoir. The cover portion includes a reservoir coupling region, a feeding region, and a first mating region. The reservoir coupling region is configured to be coupled to the mouth of the reservoir. The feeding region is configured to accommodate a beak of a hummingbird to access nectar. The bottom portion includes a second mating region configured to mate with the first mating region.

Preferably, the mouth of the reservoir includes a first spiral thread and the reservoir coupling region of the cover includes a second spiral thread. The second spiral thread is configured to couple with the first spiral thread to provide an air tight seal.

Preferably, the first mating region and the second mating region are configured to provide a water-tight seal.

The cover portion includes a top surface. Preferably, the feeding region is disposed on the top surface. Preferably, the top surface is configured to slope down from the reservoir coupling region to an outer edge of the cover portion. Preferably, the feeding region includes at least one feeding port. Each feeding port is configured to accommodate a beak of a hummingbird. Preferably, there are ten feeding ports equally spaced on the top surface. Preferably, the feeding region includes a raised surface that surrounds at least one feeding port. Preferably, the raised surface is configured in the shape of a flower. Preferably, the bottom portion includes a retaining wall that retains liquid within an inner region of the bottom portion defined by the retaining wall and restricts liquid from flowing to an outer region of the bottom portion.

In another embodiment of the present invention, a base of a hummingbird feeder contains a coupling region configured to couple with a reservoir of the hummingbird feeder. The base also includes a feeding region surrounding the coupling region that contains at least one feeding port configured to accommodate a beak of a hummingbird. A mating region surrounds the feeding region, wherein the mating region is configured to detachably couple a cover portion of the base to a bottom portion of the base. The mating region preferably includes four pairs of cover mating units and bottom mating units, where each of the cover mating units is attached to the cover portion of the base and each of the bottom mating units is attached to the bottom portion of the base. The bottom portion includes a retaining wall that retains liquid within an inner region of the bottom portion defined by the retaining wall and restricts liquid from flowing to an outer region of the bottom portion.

DETAILED DESCRIPTION OF PREFERRED EMBODIMENTS

Figure 1:
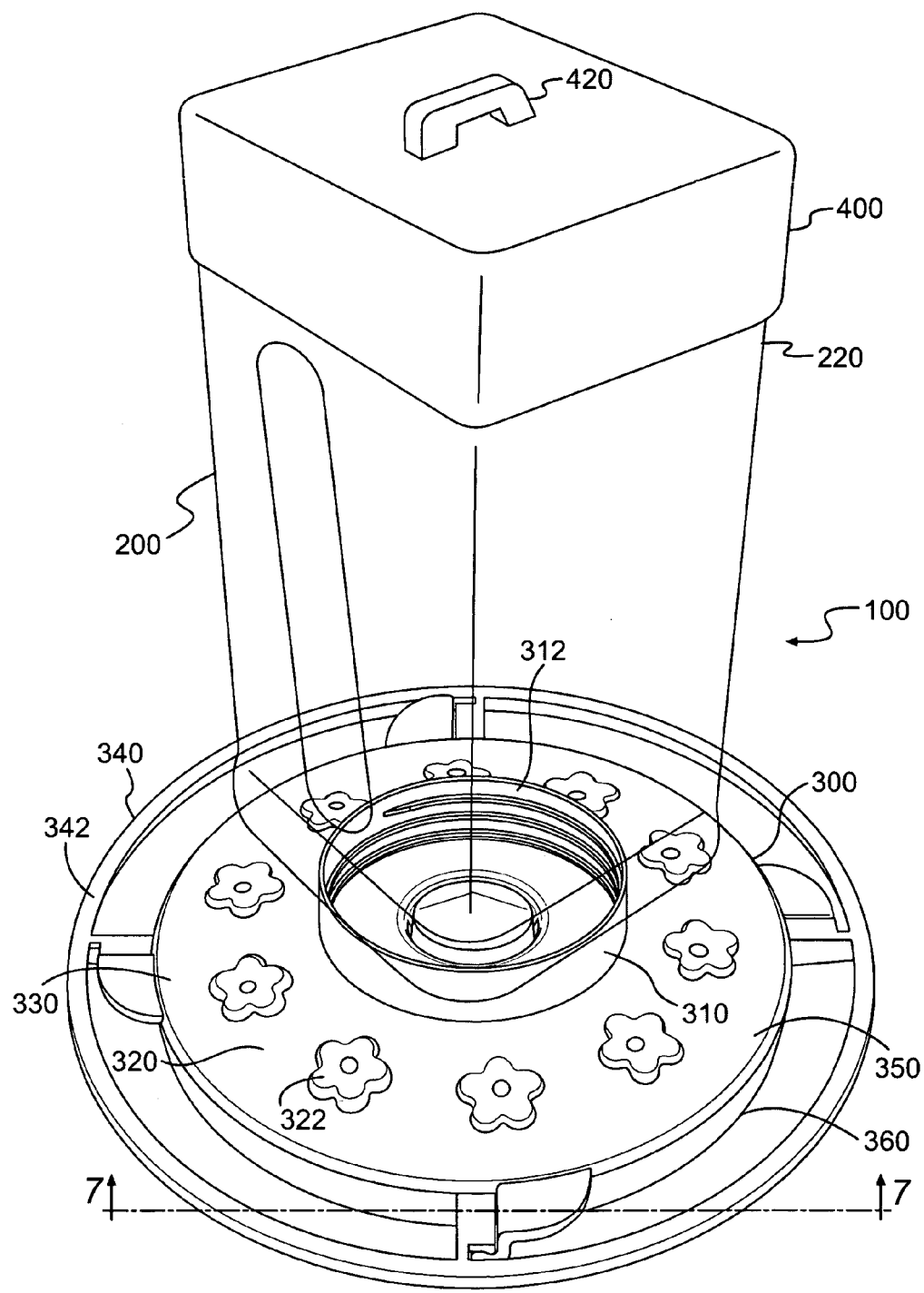
FIG. 1 is a schematic diagram illustrating a preferred embodiment of the invention in its fully assembled condition, which can be configured to be mounted on a mounting pole or be hung on a tree.
Figure 2:
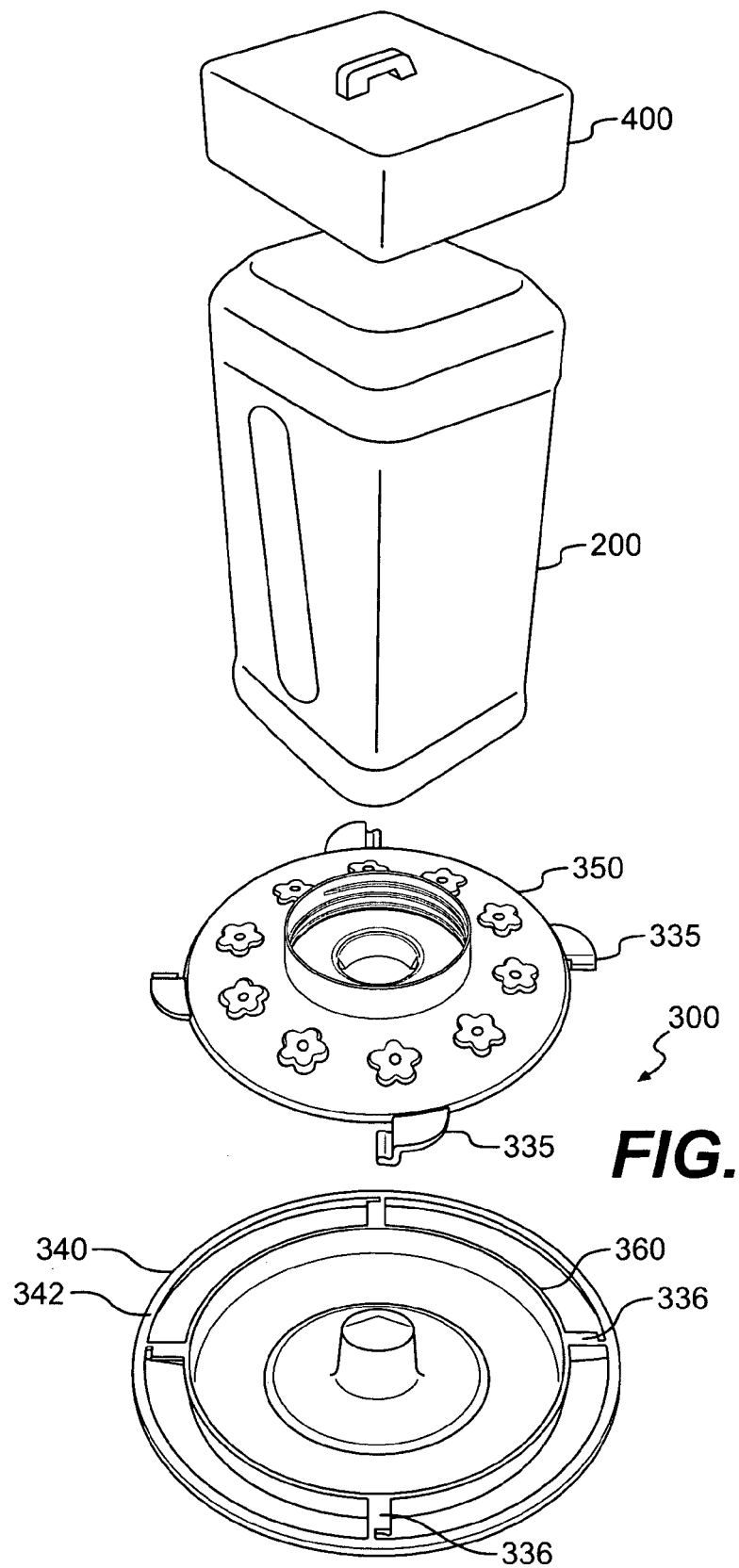
FIG. 2 is a schematic diagram showing the preferred embodiment of FIG. 1 in its disassembled condition.
Figure 3A:
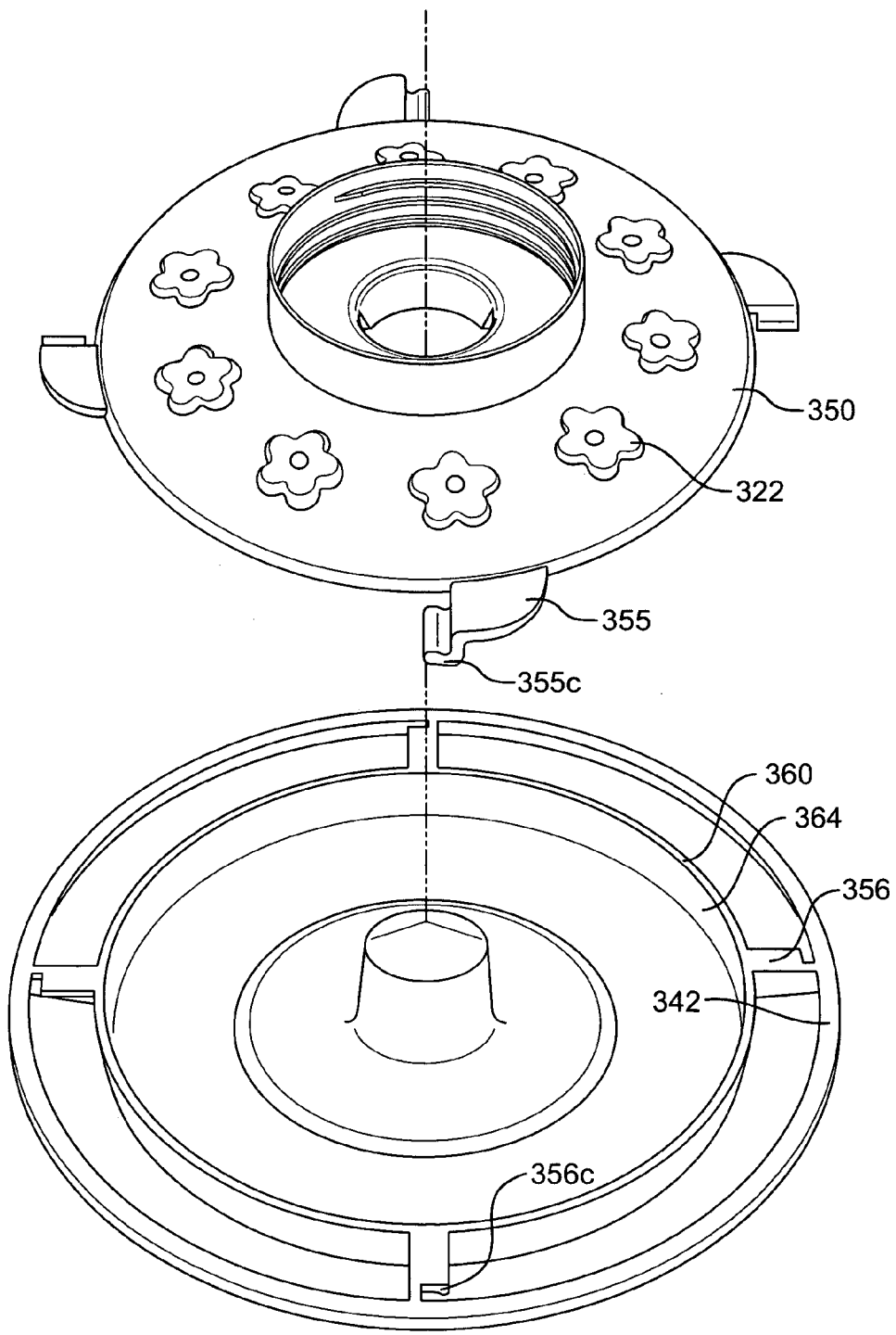
FIG. 3A illustrates the perspective views of a cover portion and a bottom portion of an exemplary base of the invention.
Figure 3B:
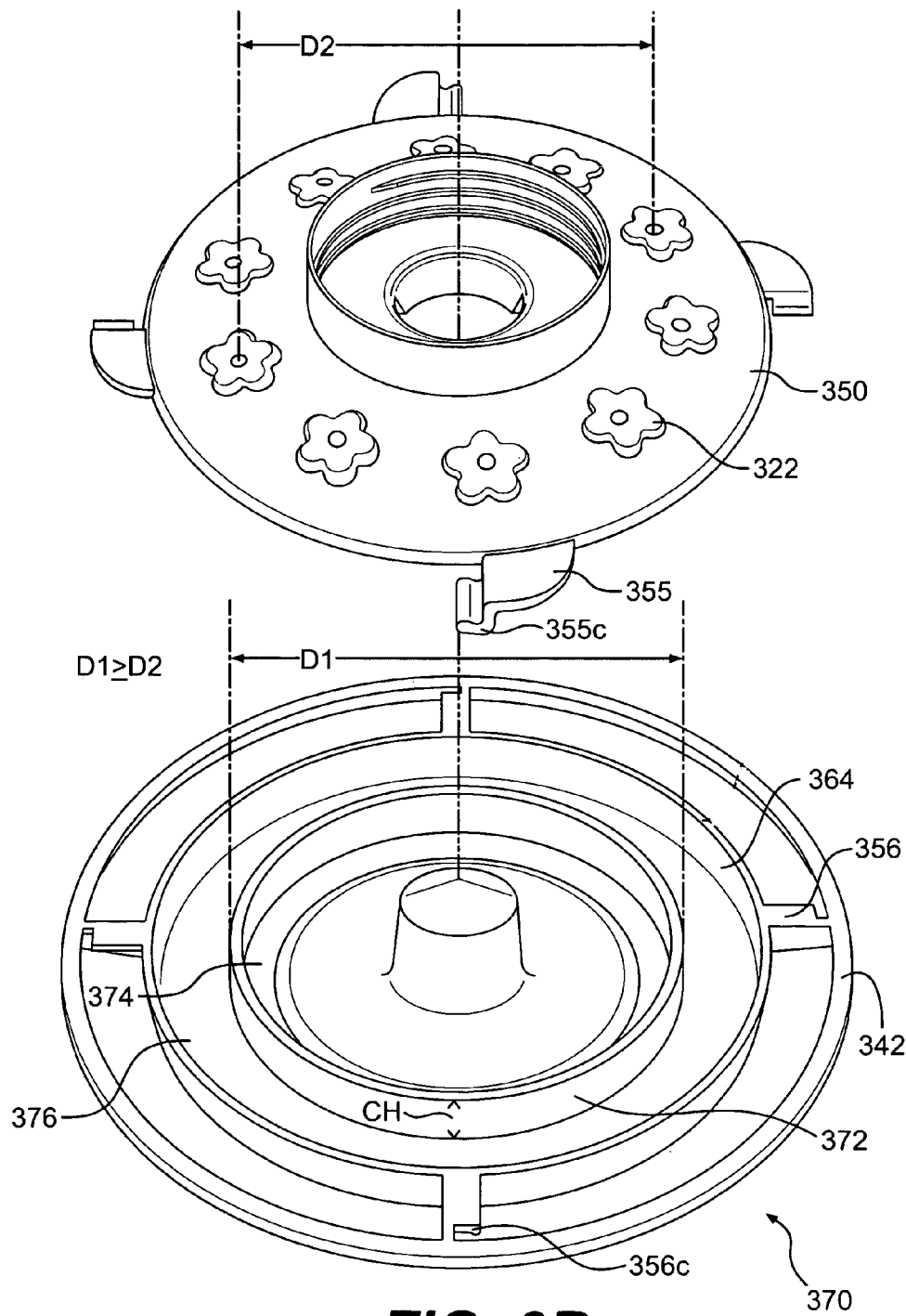
FIG. 3B illustrates a bottom portion of a hummingbird feeder that includes a retaining wall, according to a preferred embodiment of the present invention.
Figure 4A:
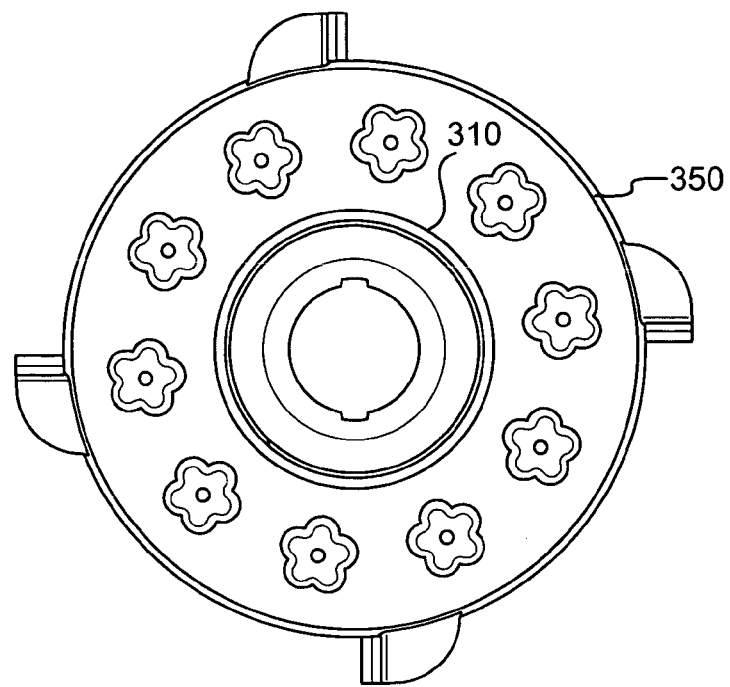
FIGS. 4A and 4B depict the top views of the cover portion and the bottom portion, respectively, of FIG. 3.
Figure 4B:
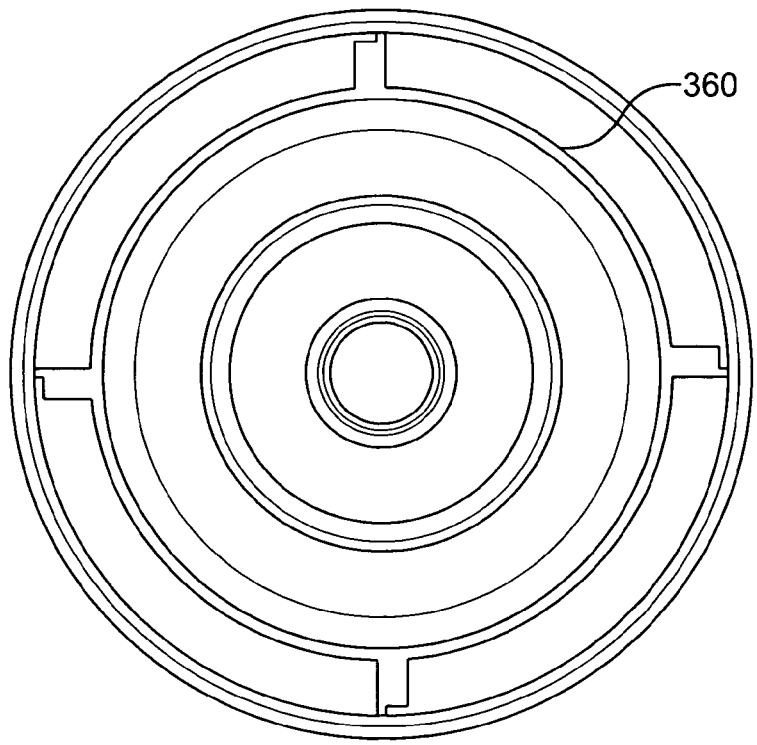
Figure 5A:
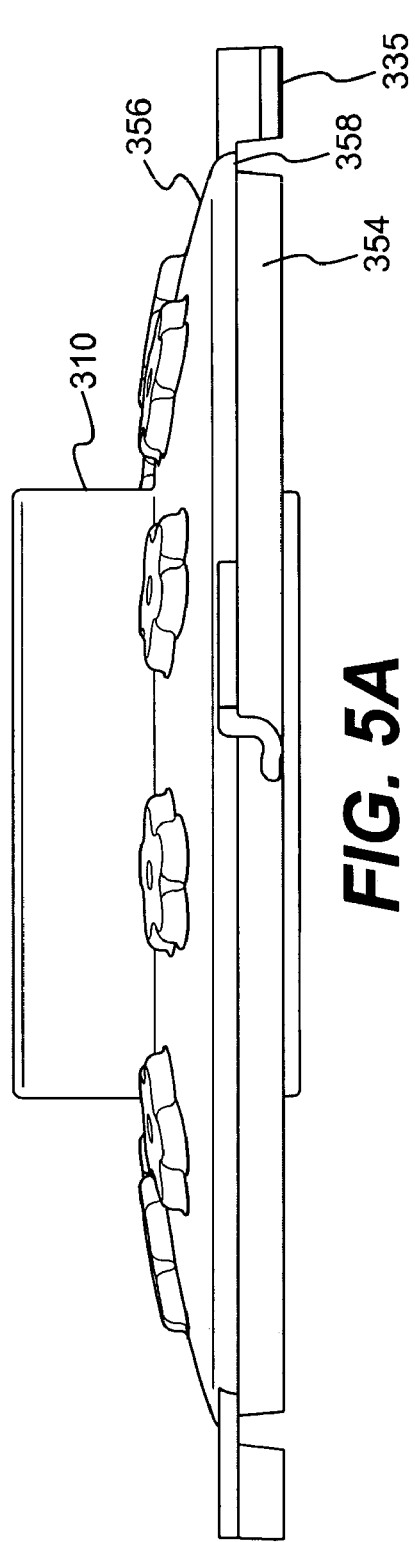
FIGS. 5A and 5B depict the side views of the cover portion and the bottom portion, respectively, of FIG. 3.
Figure 5B:
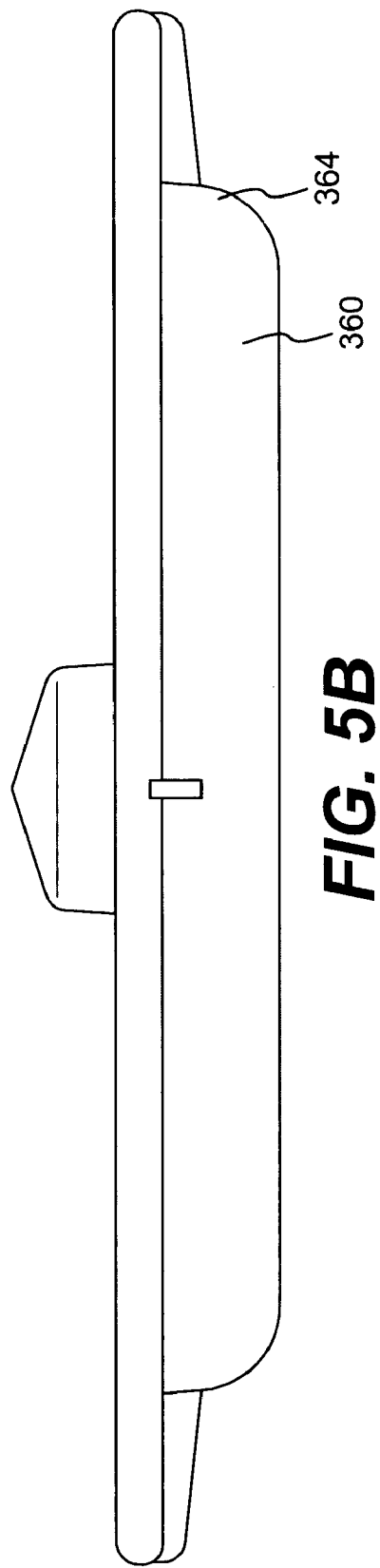
Figure 6A:
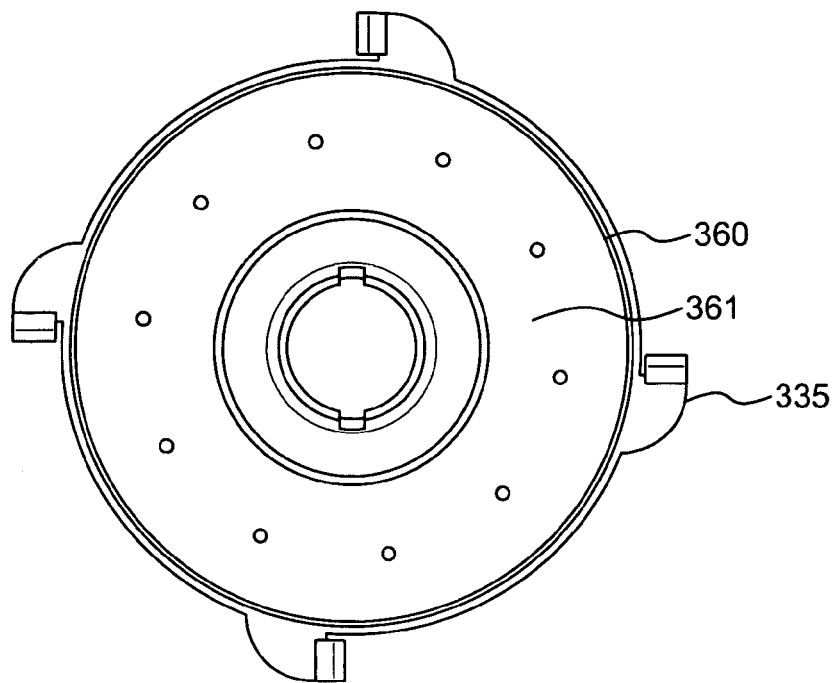
FIGS. 6A and 6B depict the bottom views of the cover portion and the bottom portion, respectively, of FIG. 3.
Figure 6B:
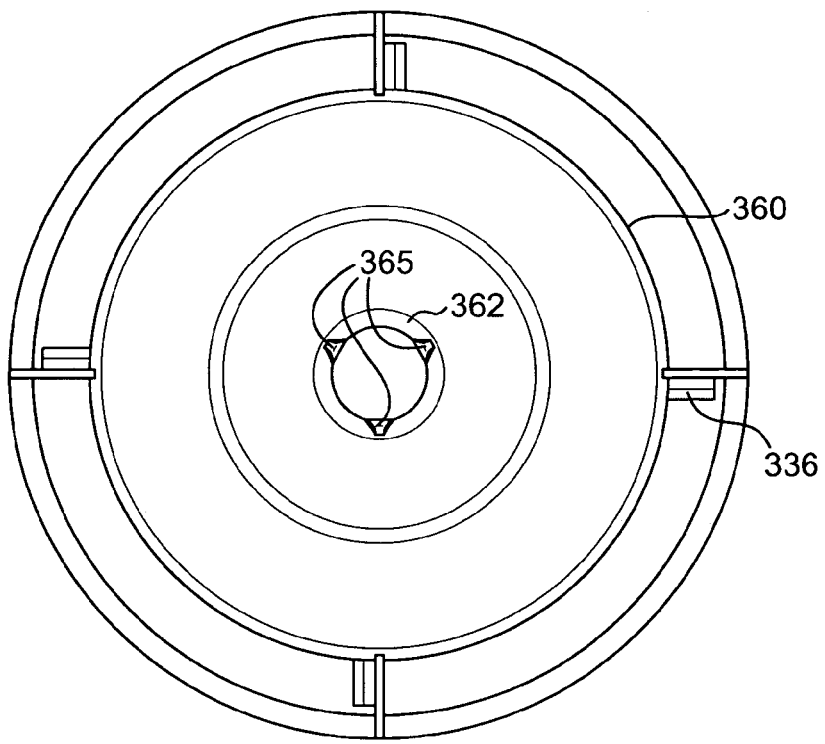
Figure 7:
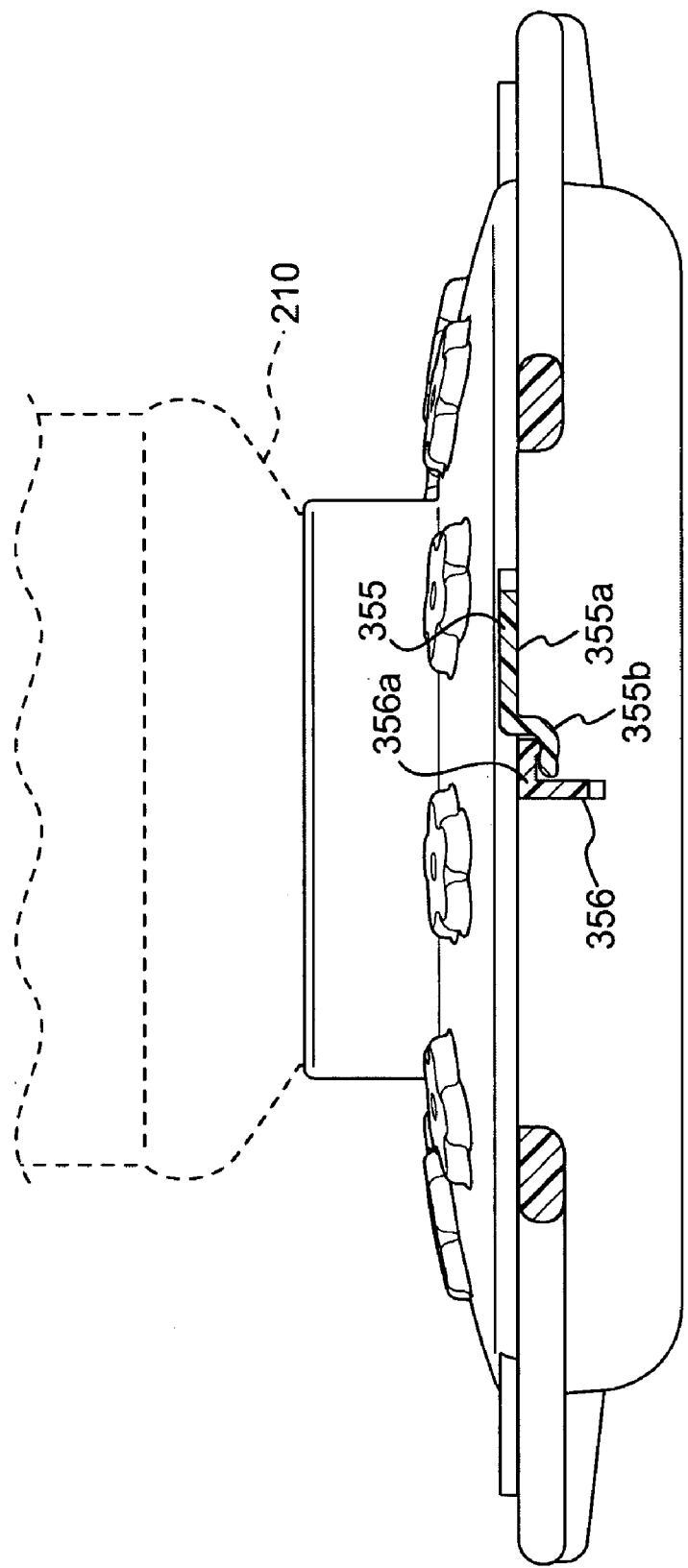
FIG. 7 depicts the details of a cover portion mating member and a bottom portion mating member that couple the cover portion and the bottom portion of FIG. 3A.
Figure 8:
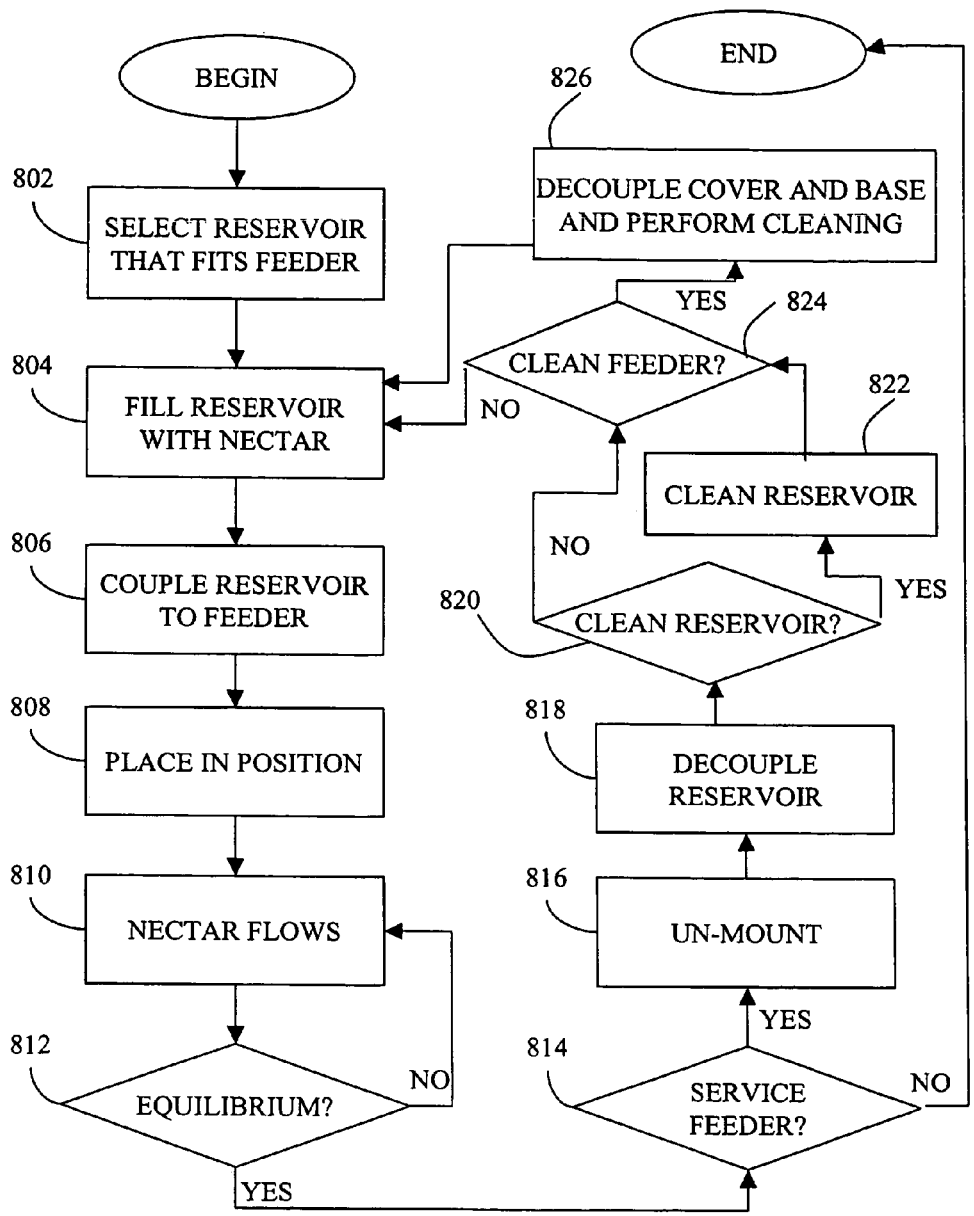
FIG. 8 is a flowchart showing an exemplary method for using the exemplary hummingbird feeder shown in FIG. 3.

FIG. 1 is a diagram showing a preferred embodiment of the invention. Hummingbird feeder system 100 includes reservoir 200, feeder base 300, and optional hanging cap 400. FIG. 2 is a schematic diagram showing the preferred embodiment of FIG. 1 in its disassembled condition. FIGS. 3A and 3B show the perspective views of cover portion 350 and respective bottom portions 360 and 370. FIGS. 4A and 4B show the top views of cover portion 350 and bottom portion 360. FIGS. 5A and 5B show the side views of cover portion 350 and bottom portion 360. FIGS. 6A and 6B show the bottom views of cover portion 350 and bottom portion 360. FIG. 7 shows the details of mating region 330. FIG. 8 is a flowchart showing an exemplary method for using the exemplary hummingbird feeder shown in FIG. 3A.

Feeder base 300 includes coupling portion 310, feeding region 320, mating region 330, and optional perching region 340. Feeder base 300 includes cover portion 350 and bottom portion 360 (see FIGS. 2–3A). Cover portion 350 and bottom portion 360 are preferably completely detachable from each other. Cover portion 350 and bottom portion 360 are attached to each other at mating region 330.

Hummingbird feeder system 100 can be configured to be hung on a support member, such as a tree branch. For example, hanging cap 400 can be configured to include loop 420 that can be used to receive a chain, a rope, or the like for hanging purposes. Hanging cap 400 is configured to be coupled to top region 220 of reservoir 200.

In a different embodiment, bottom portion 360 can be configured to include mounting cave 362 (see FIG. 6B) to receive a mounting pole. For example, mounting cave 362 can be configured to receive a standard pipe that serves as the mounting pole. Preferably, mounting cave 362 is configured to receive a cylindrical mounting pole. For example, mounting cave 362 is appropriately sized to receive a standard pipe with a nominal diameter of about one inch. Mounting cave 362 is preferably between about one-half inch to one inch deep. Mounting cave 362 preferably includes at least one tooth 365, which is configured to provide snug fit with the cylindrical mounting pole.

Reservoir 200 is configured to contain nectar. Preferably, reservoir 200 is configured to store about 16 to 32 fluid ounces (oz) of nectar. Preferably, reservoir 200 has mouth 210 (see FIG. 7) having a diameter of about 2.5 inches or larger. This diameter allows a user's hand or a sponge or rag to reach into the interior of reservoir 200 for cleaning purposes. Reservoir 200 may have a rectangular prism shape as shown in FIG. 1. Alternatively, reservoir 200 may be configured to have a cylindrical or another shape. In other words, reservoir 200 can be of any shape or have any capacity so long as it is configured to be coupled to feeder base 300. Preferably, as depicted in FIG. 1, reservoir 200 has a translucent appearance. The translucent quality of reservoir 200 provides several benefits. For example, the translucent characteristics allow easy determination of nectar level within reservoir 200 as well as provide a more aesthetic appearance.

Reservoir 200 and feeder base 300 can be coupled using any known coupling mechanism. As depicted in FIG. 1, the preferred coupling mechanism includes complementary spiral threads on each of reservoir 200 and feeder base 300 that lock onto each other. For example, coupling portion 310 of feeder base 300 may be configured to include feeder mating unit 312, and mouth 210 may be configured to include a reservoir mating unit (not shown) that locks with feeder mating unit 312. Exemplary embodiments of the invention use complementary spiral threads as feeder mating unit 312 and the reservoir mating unit (not shown).

As depicted in FIG. 2, feeder base 300 includes cover portion 350 and bottom portion 360. Further, mating region 330 (depicted in FIG. 1) includes one or more pairs of cover mating member 335 (hereinafter also referred to as "cover mating unit") and base mating member 336 (hereinafter also referred to as "bottom mating unit"). Cover mating member 335 is preferably integrated to cover portion 350, and bottom mating member 336 is preferably integrated to bottom portion 360. Preferably, in the case of more than one cover and base mating member, the mating members are equally spaced.

In the preferred embodiment shown in FIGS. 1 and 2, perching region 340 includes a perching ring 342. As depicted, perching ring 342 is configured to be part of bottom portion 360 and is connected to four base mating members 336. In another embodiment, perching region 340 can be configured to be attached to cover mating members 335 or otherwise be integrated as part of cover portion 350.

As discussed above, coupling portion 310 includes feeder mating unit 312 which is configured to mate with corresponding reservoir mating unit (not shown) associated with reservoir 200. Preferably, as shown in FIG. 4, coupling portion 310 has a circular shape. The circular shape is desirable for accommodation of a reservoir that has a circular coupling region. Coupling portion 310 may have a different shape, for example, a square shape coupling portion that can be used to couple with a reservoir with a similar square shape coupling region. In that embodiment, mating unit 312 would not include a spiral thread. Instead, mating unit 312 may employ known snap-on mechanism. In summary, coupling portion 310 can be configured to any shape to correspond with the shape of a coupling region of a reservoir.

Feeding portion 320 is configured to attract hummingbirds and to allow the birds to retrieve nectar within. Exemplary feeding region 320 shown in the drawings includes 10 feeding ports 322. Each feeding port 322 is appropriately sized to accommodate the beak of a hummingbird. Preferably, one or more feeding ports 322 are shaped like a flower as depicted in the drawings. Preferably, feeding ports 322 are further configured to include an attractive color that would attract hummingbirds. For example, feeding ports 322 are preferably red or other natural colors of flowers.

FIGS. 3A, 5A, 5B, and 7 depict details of cover portion 350 and base portion 360 according to preferred embodiments of the present invention. As depicted in FIG. 5A, cover portion 350 includes a cylindrical mating ridge 354 whose diameter is preferably less than that of circular cover portion top 356. As further depicted in FIGS. 3A and 5B, base portion 360 is preferably in the shape of a hollow cylindrical dish including an outer ridge 364. In a preferred embodiment, the outer diameter of mating ridge 354 is about the same as the inner diameter of bottom portion outer ridge 364, such that, when cover portion 350 and bottom portion 360 are brought together, ridge 354 fits snugly within outer ridge 364 and rim 358 comes to rest on the top of bottom portion outer ridge 364. Accordingly, a substantially watertight seal between the cover portion mating region and the bottom portion may be formed.

FIG. 7 illustrates a side view of cover portion mating member 355 and bottom portion mating member 356. In an exemplary embodiment, member 355 includes a top region 355a and a lower region 355b, the latter of which has a somewhat "backwards L" shape when viewed in cross section from the outside.

In the example depicted in FIG. 7, bottom portion mating member 356, deposed on the outer surface of ridge 364, has a shape substantially that of an upside down "L". As depicted more clearly in FIG. 3A, top horizontal region 356a of mating member 356, and lower portion 355a of cover mating member 355 preferably include slight ridge regions 356c and 355c, on their respective horizontal surfaces.

Preferably, the dimensions and position of mating member 356 are such that, when mating ridge 354 rests within outer ridge 364, and cover portion 350 and bottom portion 360 are mutually rotated in a clockwise direction with respect to one another, lower portion 355b engages and comes to rest underneath portion 356a of bottom portion mating member. As depicted in FIG. 7, the horizontal position of portion 335b with respect to that of 356b is such that ridge regions 355c and 356c (see FIG. 3A) interlock. Accordingly, when feeder 100 is suspended or otherwise held by the top reservoir, bottom portion 360 is nevertheless affixed securely to the cover portion, so that counterclockwise rotation and the potential for dislodging of the bottom portion are reduced.

FIG. 3A additionally illustrates optional perch 342, according to an exemplary embodiment of the present invention. In the example shown, perch 342 forms a ring that is joined to bottom portion 360 through mating members 356, although perch 342 may alternatively be joined to cover portion 350. Preferably, the diameter of the ring is such that, when cover portion 350 and bottom portion 360 are joined and a hummingbird perches with its feet on the ring, its beak can conveniently reach a hole in feeding port 322. Preferably, the width of the ring is between about an eighth of an inch and a quarter of an inch, such that a hummingbird can conveniently grip the perch during feeding.

FIG. 3B illustrates a bottom portion 370 of a hummingbird feeder that includes a retaining wall 372 that lies within outer ridge 364, according to another exemplary embodiment of the present invention. Preferably, wall 372 forms a cylinder that is concentric with ridge 364, where the cylinder height CH is sufficient to retain hummingbird nectar within region 374, and prevent spillage of nectar into outer region 376. Preferably height CH is sufficient to abut a lower surface 361 (see FIG. 6A) of cover portion 350 when cover portion 350 and base portion 360 are securely affixed together. Preferably, the diameter D1 of retaining wall 372 is greater than the diameter D2 of a circle defining the outer points of the holes of feeding ports 322, with respect to the center of cover 350. Accordingly, each feeding port hole is located over a portion of region 374 that contains hummingbird nectar when cover 360, affixed to bottom portion 370, is joined to reservoir 200 containing nectar, and the whole assembly is arranged according to FIG. 1. An advantage of the embodiment illustrated in FIG. 3B, is that the weight of liquid residing within feeder base 300 is reduced by limiting the nectar to region 374, as opposed to when it also resides in region 376. Thus, less force is placed on cover portion mating members 355 (see FIG. 7) by the weight of bottom portion 360 and nectar contained therein. Additionally, because liquid is contained only within region 374 during feeder use, cleanup of bottom portion 360 especially in outer portions, is made easier due to less tendency for spillage and seepage to the outside of feeder base 300.

FIG. 8 is a flowchart showing an exemplary method for using the exemplary hummingbird feeder shown in FIG. 2.

In step 802, a suitable nectar reservoir is selected. Selection of the nectar reservoir depends on one simple consideration: whether a mouth of the nectar reservoir can be securely coupled to coupling region 310 of feeder base 300. As noted above, reservoir 200 is an exemplary reservoir that can be used.

In step 804, reservoir 200 is filled with nectar.

In step 806, reservoir 200 is coupled to feeder base 300. In a preferred embodiment that includes corresponding spiral threads on each of reservoir 200 and coupling portion 310, hummingbird feeder base 300 is twisted clockwise relative to reservoir 200. If feeder base 300 includes cover portion 350 and bottom portion 360, these two components are preferably assembled together first prior to coupling reservoir 200 to feeder base 300. As discussed above, coupling of cover portion 350 and bottom portion 360 can be accomplished by mating one or more pairs of corresponding feeder mating unit 335 and base mating unit 336.

In step 808, hummingbird feeder base 300 and reservoir 200 are placed in an operating position. As discussed above, if feeder base 300 includes mounting cave 362, feeder base 300 can be mounted on a mounting pole.

In step 810, once feeder base 300 and reservoir 200 are properly placed in position, nectar within reservoir 200 flows from reservoir 200 into feeder base 300 via coupling region 310.

In step 812, if an equilibrium is reached, the process goes to step 814. Otherwise, nectar continues to flow until the equilibrium is reached. Similarly, as nectar is consumed (or evaporated or otherwise lost due to spillage, etc.), nectar flows from reservoir 200 into feeder base 300 to maintain the air pressure equilibrium.

In step 814, if service is needed, the process goes to step 816. Service can involve refilling or cleaning.

In step 816, hummingbird feeder base 300 is taken off, e.g., removed from the mounting pole or from a hang hole.

In step 818, reservoir 200 is de-coupled from hummingbird feeder base 300. In the preferred embodiment that includes corresponding spiral threads on each of reservoir 200 and coupling portion 310, hummingbird feeder base 300 is twisted counter-clockwise relative to reservoir 200.

In step 820, if a user observes that reservoir 200 requires cleaning, a user can simply follow the following steps. For example, in step 822, to clean reservoir 200, the user can use his or her hand or a sponge to wipe clean the interior of reservoir 200. This is possible because mouth 210 is large enough so that a brush in not needed.

If reservoir 200 does not need cleaning, then in step 824, a user can determine whether to clean feeder base 300. If a user suspects or knows that feeder base 300 requires cleaning, then in step 826 cover portion 350 is separated from bottom portion 360. This can be done by decoupling mating units 335 and 336. Again, cleaning of the interior of feeder base 300 can then be easily accomplished.

If the feeder does not require cleaning, then the user proceeds directly to step 804, reservoir 200 is placed upside-down, and refilled with nectar. After the necessary servicing steps are completed, the reservoir is coupled to the feeder once more in step 806.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A base of a hummingbird feeder comprising:
a coupling region configured to couple with a reservoir of the hummingbird feeder;
a feeding region surrounding the coupling region, wherein the feeding region comprises at least one feeding port configured to accommodate a beak of a hummingbird;
a mating region surrounding the feeding region, wherein the mating region is configured to detachably couple a cover portion of the base to a bottom portion of the base, wherein the bottom portion includes a retaining wall that retains liquid within an inner region of the bottom portion defined by the retaining wall and restricts liquid from flowing to an outer region of the bottom portion, at least one portion of the mating region comprising a mating member disposed on an outer surface of the cover portion;
wherein the mating region includes four pairs of cover mating units and bottom mating units, each of the cover mating units is attached to the cover portion of the base and each of the bottom mating units is attached to the bottom portion of the base; and
wherein a cover mating unit comprises a substantially backward L shape portion when viewed from the side, and wherein a bottom mating unit comprises a substantially upside down L shape when viewed from the side.

2. A base of a hummingbird feeder comprising:
a coupling region configured to couple with a reservoir of the hummingbird feeder;
a feeding region surrounding the coupling region, wherein the feeding region comprises at least one feeding port configured to accommodate a beak of a hummingbird;
a mating region surrounding the feeding region, wherein the mating region is configured to detachably couple a cover portion of the base to a bottom portion of the base, wherein the bottom portion includes a retaining wall that retains liquid within an inner region of the bottom portion defined by the retaining wall and restricts liquid from flowing to an outer region of the bottom portion, at least one portion of the mating region comprising a mating member disposed on an outer surface of the cover portion;
wherein the mating region includes four pairs of cover mating units and bottom mating units, each of the cover mating units is attached to the cover portion of the base and each of the bottom mating units is attached to the bottom portion of the base;
wherein a cover mating unit comprises a substantially backward L shape portion when viewed from the side, and wherein a bottom mating unit comprises a substantially upside down L shape when viewed from the side; and
wherein a cover mating unit comprises a ridge region, wherein a bottom mating unit comprises a ridge region, wherein the cover and the bottom mating units are configured to interlock when they are mutually rotated in a clockwise direction with respect to one another.

3. A base of a hummingbird feeder comprising:
a coupling region configured to couple with a reservoir of the hummingbird feeder;
a feeding region surrounding the coupling region, wherein the feeding region comprises at least one feeding port configured to accommodate a beak of a hummingbird;
a mating region surrounding the feeding region, wherein the mating region is configured to detachably couple a cover portion of the base to a bottom portion of the base, wherein the bottom portion includes a retaining wall that retains liquid within an inner region of the bottom portion defined by the retaining wall and restricts liquid from flowing to an outer region of the bottom portion, at least one portion of the mating region comprising a mating member disposed on an outer surface of the cover portion;
further comprising a perching region surrounding the mating wherein the perching region is configured to accommodate at least one hummingbird;
wherein the mating region includes four cover mating units and four bottom mating units, each of the cover mating units is attached to the cover portion of the base and each of the base mating units is attached to the bottom portion of the base, wherein the perching region is attached to one the cover portion of the base and the bottom portion of the base; and
wherein each cover mating unit comprises a portion that has a substantially L-shaped cross-section, and wherein each bottom mating unit comprises a substantially upside down L-shaped cross-section.

* * * * *